United States Patent
Juels et al.

(10) Patent No.: US 8,346,742 B1
(45) Date of Patent: Jan. 1, 2013

(54) REMOTE VERIFICATION OF FILE PROTECTIONS FOR CLOUD DATA STORAGE

(76) Inventors: Ari Juels, Brookline, MA (US); Marten Erik van Dijk, Somerville, MA (US); Alina Oprea, Waltham, MA (US); Ronald L. Rivest, Arlington, MA (US); Emil P. Stefanov, Berkeley, CA (US)

( * ) Notice: Subject to any disclaimer, the term of this patent is extended or adjusted under 35 U.S.C. 154(b) by 0 days.

(21) Appl. No.: 13/075,848

(22) Filed: Mar. 30, 2011

(51) Int. Cl.
*G06F 17/00* (2006.01)
(52) U.S. Cl. .......................... 707/698; 713/162; 713/164
(58) Field of Classification Search ........................ None
See application file for complete search history.

(56) References Cited

U.S. PATENT DOCUMENTS

| | | | |
|---|---|---|---|
| 7,093,129 B1 * | 8/2006 | Gavagni et al. | 713/175 |
| 2003/0188012 A1 * | 10/2003 | Ford | 709/238 |
| 2004/0139152 A1 * | 7/2004 | Kaler et al. | 709/203 |
| 2008/0083031 A1 * | 4/2008 | Meijer et al. | 726/22 |
| 2009/0031128 A1 * | 1/2009 | French et al. | 713/164 |
| 2009/0235340 A1 * | 9/2009 | Tojo et al. | 726/5 |
| 2011/0246433 A1 * | 10/2011 | Sun | 707/698 |
| 2011/0276490 A1 * | 11/2011 | Wang et al. | 705/50 |

OTHER PUBLICATIONS

Bindel et al, "Extended Cryptographic File System", 1999.*
Courant et al, "Automated Proofs for Asymmetric Encryption", 2010.*
Kumar et al, "Data Integrity Proofs in Cloud Storage", IEEE, Feb 2011.*
Sadeghi et al, "Token-Based Cloud Computing", 2010.*
Wang et al, "Toward Publicly Auditable Secure Cloud Data Storage Services", IEEE, Aug. 2010.*
Amanatidis et al, "New Security Models and Provably-Secure Schemes for Basic Query Support in Outsourced Databases", 2009.*
Ateniese et al, "Provable Data Possession at Untrusted Stores", 2007.*
Kamara et al, "Cryptographic Cloud Storage", 2009.*
Popa et al, "Enabling Security in Cloud Storage SLAs with CloudProof", 2010.*
Wang et al, "Enabling Public Auditability and Data Dynamics for Storage Security in Cloud Computing", 2010.*
G. Ateniese et al., "Provable Data Possession at Untrusted Stores," ACM CCS, 2007, pp. 598-610.
G. Ateniese et al., "Scalable and Efficient Provable Data Possession," Proceedings of the 4th International Conference on Security and Privacy in Communication Networks, Apr. 2008, 11 pages.
M. Bellare et al., "Forward-Security in Private-Key Cryptography," Topics in Cryptology—CT-RSA, Nov. 2000, 24 pages.

(Continued)

*Primary Examiner* — Hung Le
(74) *Attorney, Agent, or Firm* — Ryan, Mason & Lewis, LLP

(57) ABSTRACT

A client device or other processing device comprises a file processing module, with the file processing module being operative to request proof from a file system that a file having a first format is stored by the file system in a second format different than the first format, to receive the proof from the file system, and to verify that the file is stored in the second format using the proof provided by the file system responsive to the request. The proof is based at least in part on application of a function to the file in the second format, and the function imposes a minimum resource requirement on generation of the proof. The file system may comprise one or more servers associated with a cloud storage provider. Advantageously, one or more illustrative embodiments allow a client device to verify that its files are stored by a cloud storage provider in encrypted form or with other appropriate protections.

23 Claims, 4 Drawing Sheets

OTHER PUBLICATIONS

J. Black et al., "UMAC: Fast and Secure Message Authentication," CRYPTO '99, Advances in Cryptology, Aug. 1999, 18 pages.

M. Blum et al., "Checking the Correctness of Memories," Algorithmica, Oct. 1992, 21 pages, vol. 12, Nos. 2-3.

K.D. Bowers et al., "Proofs of Retrievability: Theory and Implementation," IACR ePrint Report, 2008, pp. 1-24.

C. Cachin et al., "Asynchronous Verifiable Secret Sharing and Proactive Cryptosystems," Proceedings of the 9th ACM Conference on Computer and Communications Security, Aug. 2002, 25 pages, Washington DC, USA.

C. Cachin et al., "Asynchronous Verifiable Information Dispersal," 24th IEEE Symposium on Reliable Distributed Systems, Nov. 2004, 20 pages.

J.L. Carter et al., "Universal Classes of Hash Functions," Extended Abstract, Proceedings of the 9th Annual ACM Symposium on Theory of Computing, May 1977, pp. 106-112.

M. Castro et al., "Proactive Recovery in a Byzantine-Fault-Tolerant System," 4th Symposium on Operating System Design and Implementation, Oct. 2000, 15 pages.

R. Curtmola et al., "Robust Remote Data Checking," 4th ACM International Workshop on Storage Security and Survivability, Oct. 2008, 6 pages.

R. Curtmola et al., "MR-PDP: Multiple-Replica Provable Data Possession," International Conference on Distributed Computing Systems, Jun. 2008, 10 pages.

M. Etzel et al., "Square Hash: Fast Message Authentication via Optimized Universal Hash Functions," CRYPTO '99, Advances in Cryptology, Aug. 1999, 21 pages.

D.L.G. Filho et al., "Demonstrating Data Possession and Uncheatable Data Transfer," IACR, Report 2006/150, http://eprint.iacr.org/2006/150, 2006, 9 pages.

J.A. Garay et al., "Secure Distributed Storage and Retrieval," Theoretical Computer Science 243, Jul. 2000, pp. 363-389.

G.R. Goodson et al., "Efficient Byzantine-Tolerant Erasure-Coded Storage," 34th International Conference on Dependable Systems and Networks, Jun.-Jul. 2004, pp. 135-144.

S. Halevi et al., "MMH: Software Message Authentication in the Gbit/second Rates," Fast Software Encryption: 4th International Workshop, FSE '97, Mar. 1997, pp. 1-15, Haifa, Israel.

J. Hendricks et al., "Verifying Distributed Erasure-Coded Data," 26th ACM Symposium on Principles of Distributed Computing, Aug. 2007, 8 pages.

A. Herzberg et al., "Proactive Public Key and Signature Systems," Proceedings of the 4th ACM Conference on Computer and Communications Security, Dec. 1996, 15 pages.

A. Herzberg et al., "Proactive Secret Sharing or: How to Cope with Perpetual Leakage," CRYPTO, Springer-Verlag, Nov. 1995, 22 pages.

A. Juels et al., "PORs: Proofs of Retrievability for Large Files," ACM CCS, 2007, 22 pages.

H. Krawczyk, "LFSR-based Hashing and Authentication," CRYPTO, Springer-Verlag, Aug. 1998, pp. 129-139.

M. Lillibridge et al., "A Cooperative Internet Backup Scheme," Proceedings of the General Track: 2003 USENIX Annual Technical Conference, Jun. 9-14, 2003, pp. 29-41, San Antonio, Texas, USA.

W. Litwin et al., "Algebraic Signatures for Scalable Distributed Data Structures," 20th International Conference on Data Engineering, Mar.-Apr. 2004, 12 pages.

M. Naor et al., "The Complexity of Online Memory Checking," 46th Annual Symposium on Foundations of Computer Science, Oct. 2005, pp. 1-38.

W. Nevelsteen et al., "Software Performance of Universal Hash Functions," Advances in Cryptology, Eurocrypt, Springer-Verlag, May 1999, pp. 1-17.

J.S. Plank et al., "A Performance Evaluation and Examination of Open-Source Erasure Coding Libraries for Storage," 7th USENIX Conference on File and Storage Technologies (FAST), 2009, pp. 253-265.

M.O. Rabin et al., "Efficient Dispersal of Information for Security, Load Balancing, and Fault Tolerance," Journal of the Association for Computing Machinery, Apr. 1989, pp. 335-348, vol. 36, No. 2.

P. Rogaway, "Bucket Hashing and its Application to Fast Message Authentication," Journal of Cryptology, Oct. 1997, pp. 1-24.

T. Schwarz et al., "Store, Forget, and Check: Using Algebraic Signatures to Check Remotely Administered Storage," IEEE International Conference on Distributed Computing Systems (ICDCS), 2006, 10 pages.

H. Shacham et al., "Compact Proofs of Retrievability," Proceedings of Asiacrypt, Report 2008/073, Dec. 2008, pp. 1-36.

M.A. Shah et al., "Auditing to Keep Online Storage Services Honest," Proceedings of the 11th USENIX Workshop on Hot Topics in Operating Systems, May 2007, 6 pages, No. 11, San Diego, CA, USA.

V. Shoup, "On Fast and Provably Secure Message Authentication Based on Universal Hashing," CRYPTO 1996, Dec. 1996, pp. 313-328, vol. 1109.

M.W. Storer et al., "POTSHARDS: Secure Long-Term Storage Without Encryption," USENIX Annual Technical Conference, Jun. 2007, pp. 143-156.

K.D. Bowers et al., "HAIL: A High-Availability and Integrity Layer for Cloud Storage," ACM Conference on Computer and Communications Security, Nov. 2009, pp. 187-198.

H. Krawczyk et al., "HMAC-Based Extract-and-Expand Key Derivation Function (HKDF)," IETF RFC 5869, May 2010, pp. 1-15.

M. Burdon et al., "Encryption Safe Harbours and Data Breach Notification Laws," Computer Law & Security Review, 2010, pp. 520-534, vol. 26, No. 5.

R.L. Rivest, "All-or-Nothing Encryption and the Package Transform," in Fast Software Encryption, Lecture Notes in Computer Science, Jan. 1997, pp. 210-218, vol. 1267.

U.S. Appl. No. 12/495,189 filed in the name of K.D. Bowers et al. on Jun. 30, 2009 and entitled "Distributed Storage System with Enhanced Security."

U.S. Appl. No. 12/827,097 filed in the name of A. Juels et al. on Jun. 30, 2010 and entitled "Distributed Storage System with Efficient Handling of File Updates."

* cited by examiner

ALGORITHM 1 BUTTERFLY HOURGLASS CONSTRUCTION

1: for $k$ from 0 to $n/2^j - 1$ do
2:    for $i$ from 1 to $2^{j-1}$ do
3:       $(G_j[i + k], G_j[i + k + 2^{j-1}]) \leftarrow w(G_{j-1}[i + k], G_{j-1}[i + k + 2^{j-1}]);$
4:    end for
5: end for

US 8,346,742 B1

REMOTE VERIFICATION OF FILE PROTECTIONS FOR CLOUD DATA STORAGE

FIELD OF THE INVENTION

The present invention relates generally to the field of data storage, and more particularly to cryptographic techniques for verifying that a given stored file is actually stored with appropriate protections such as encryption.

BACKGROUND OF THE INVENTION

Cloud data storage is swiftly supplanting many forms of local storage for consumers and enterprises alike. Cloud storage providers have an interest in demonstrating that files in their custody enjoy strong confidentiality and other protections, both to differentiate their services and to ease regulatory compliance for their clients.

For example, security breach notification laws in the United States, such as those in the recently-enacted HITECH (Health Information Technology for Economic and Clinical Health) Act, typically include a safe harbor exemption for encrypted data. To benefit from such provisions, cloud storage providers must demonstrate at a minimum that while in storage, files are in encrypted form. See M. Burdon et al., "Encryption safe harbours and data breach notification laws," Computer Law & Security Review, 26(5):520-534, 2010.

Auditors today commonly rely on periodic facility inspections and system architecture and configuration reviews to verify compliance with data-handling requirements under established standards such as Statement on Auditing Standards (SAS) No. 70. Such approaches are expensive and error prone. They do not support continuous monitoring or extensive fine-grained inspection and often presume correct reduction of security policies to practice. Automated verification of stored file formats is thus a compelling alternative or supplement to traditional audit approaches. To maximize cost effectiveness and minimize trust assumptions in an audited cloud storage provider, such verification should be executable remotely, e.g., by an auditor over the Internet.

Verifying that a file is encrypted would be much easier for an auditor or client that had sole possession of the encryption keys. In order for a cloud storage provider to compute over stored, encrypted data and furnish plaintext on demand, however, the provider itself must encrypt the file and manage the keys. This is the most common cloud storage model and the one that burdens clients the least. Furthermore, for a cloud storage provider to assume responsibility for file confidentiality and minimize security requirements for clients, it should never divulge encryption keys to external entities, the file owner included.

An auditor or client should therefore be able to verify that stored files are encrypted by a cloud storage provider that is itself managing the keys and performing the encryption and decryption operations on the files.

If the cloud storage provider holds encryption keys, then remotely verifying that stored files are encrypted presents a very difficult problem. Consider by way of example a client that entrusts a cloud storage provider with file F, asking that the cloud storage provider store it encrypted under some secret key κ as ciphertext G. How can the client verify that the cloud storage provider is actually storing G and not F? The client might challenge the cloud storage provider at a random time to send it the ciphertext G. But the cloud storage provider could deceive the client by just sending a random string R. If the cloud storage provider claims to be using an appropriate encryption algorithm, such as one that is indistinguishable under chosen ciphertext attack (IND-CCA), the client will be unable to distinguish between the random string R and the ciphertext G. It is also possible for the cloud storage provider to deceive the client by storing F in unencrypted form and then computing G on the fly, only in response to a verification request from the client.

Accordingly, a need exists for techniques for verifying that files stored by cloud storage providers are subject to appropriate protections such as encryption.

SUMMARY OF THE INVENTION

An illustrative embodiment of the invention incorporates file protection verification functionality using an "hourglass" protocol that provides an efficient and accurate technique for verifying that files stored by cloud storage providers or other types of file systems are subject to appropriate protections such as encryption. The hourglass protocol is advantageously configured to ensure that transformation of a given file from one format to another is subject to minimum resource requirements.

In one aspect of the invention, a client device or other processing device comprises a file processing module configured with file protection verification functionality. The file processing module is operative to request proof from a file system that a file having a first format is stored by the file system in a second format different than the first format, to receive the proof from the file system, and to verify that the file is stored in the second format using the proof provided by the file system responsive to the request. The proof is based at least in part on application of a function to the file in the second format, and the function imposes a minimum resource requirement on generation of the proof. The file system may comprise one or more servers associated with a cloud storage provider.

The file processing module may be operative to determine if the proof was generated by the file system within a designated amount of time from the corresponding request, accept the proof if it was so generated, and otherwise reject the proof. By way of example, the first format may be an unencrypted format and the second format may be an encrypted format to which the function is applied. In this case, the designated amount of time may be an amount of time less than that which would be required for the file system to convert the file from the unencrypted format to the encrypted format responsive to the request.

The function applied to the file in the second format in order to impose a minimum resource requirement on generation of the proof may comprise, for example, a butterfly function characterized by a butterfly network. As one possible implementation, the butterfly function may comprise a sequence of applications of a pseudo-random permutation function to pairs of blocks of the file in the second format over multiple levels, where outputs at level j are computed as a function of outputs at level j−1 for $1 \leq j \leq \log_2(n)$ and where n denotes a total number of blocks in the file.

As another example, the function applied to the file in the second format in order to impose a minimum resource requirement on generation of the proof may comprise a message-recoverable digital signature function.

The file protections that may be verified are not limited to encryption. In other embodiments, the second format may comprise a leak-incriminating encoding format in which the file is stored with an embedded provenance tag, or a file binding format in which the file is inextricably bound with at least one other file. Numerous other types of file protections can also be verified using the disclosed techniques.

The illustrative embodiments described herein advantageously overcome the above-noted difficulties associated with verifying that cloud storage providers are storing files in encrypted form. For example, using the hourglass protocol in a given one of these embodiments, a cloud storage provider cannot deceive a client by simply sending the client a random string, or by storing a file in unencrypted form and then encrypting it only upon receipt of a verification request from the client.

These and other features and advantages of the present invention will become more readily apparent from the accompanying drawings and the following detailed description.

DETAILED DESCRIPTION

The present invention will be described herein with reference to exemplary data storage systems and associated client devices, servers and other processing devices. It is to be appreciated, however, that the invention is not restricted to use with the particular illustrative system and device configurations shown. By way of example, embodiments of the invention may be implemented in a distributed storage system of the type described in U.S. patent application Ser. No. 12/495,189, filed Jun. 30, 2009 and entitled "Distributed Storage System with Enhanced Security," or U.S. patent application Ser. No. 12/827,097, filed Jun. 30, 2010 and entitled "Distributed Storage System with Efficient Handling of File Updates," which are commonly assigned herewith and the disclosures of which are hereby incorporated by reference herein.

Figure 1:
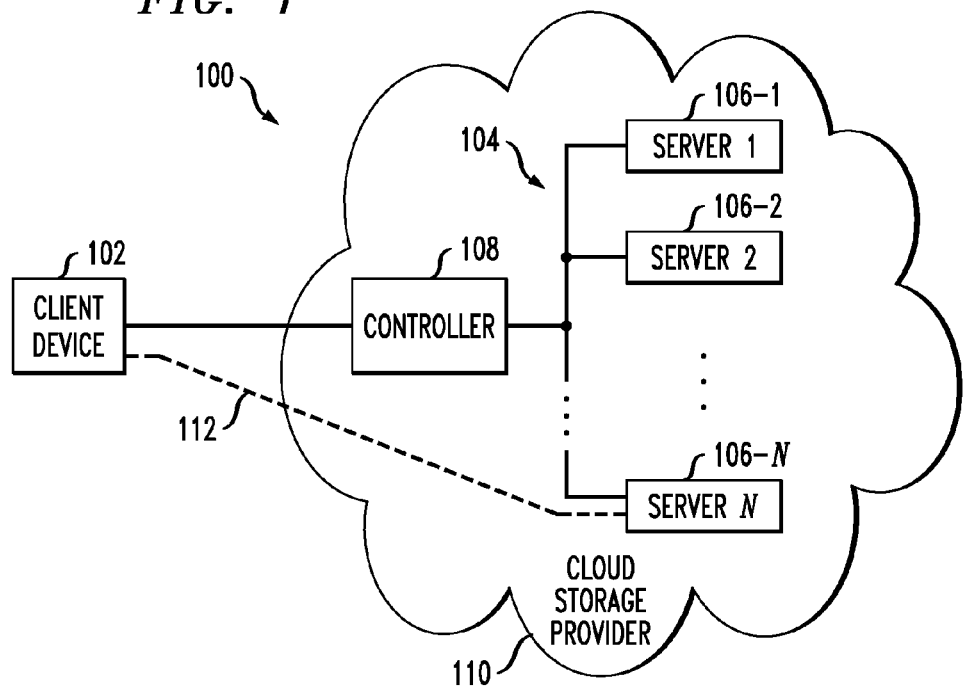
FIG. 1 is a block diagram showing one example of a data storage system in an illustrative embodiment of the invention.

FIG. 1 shows a data storage system 100 which includes a client device 102, a network 104, servers 106-1, 106-2, ... 106-N, and a controller 108. The controller 108 may be configured to direct at least a portion of the processing operations of the servers 106, such as file storage, file retrieval and file verification operations. The servers 106 and controller 108 in this embodiment are associated with a cloud storage provider 110, and collectively provide a cloud storage environment for remote storage of files by client device 102. The client device 102 is coupled to the servers 106 via the controller 108, but may additionally or alternatively interact directly with one or more of the servers 106, as indicated, for example, by the communication path shown by dashed line 112. A given file F associated with client device 102 may be stored on a particular one of the servers 106, or may be stored across multiple servers 106 using the distributed storage techniques described in the above-cited U.S. patent application Ser. Nos. 12/495,189 and 12/827,097.

As will be described in detail below, the file F is processed in system 100 in such a way that the client device 102 can obtain reliable verification from the cloud storage provider 110 that the file is in fact stored in an encrypted format. Such verification may come, for example, in the form of cryptographically-verifiable proof provided by one or more of the servers 106 or the controller 108.

The client device 102 may be, for example, a desktop, laptop or palmtop personal computer, a mobile telephone, a personal digital assistant (PDA), a wireless email device, a workstation, a kiosk, a television set-top box, a game console, or more generally any type of information processing device from which a user or other verifier may wish to verify that a given file F stored in one or more of the servers 106 is actually stored in an encrypted format. The client device may also be referred to herein as simply a "client." The latter term is intended to be construed generally, so as to encompass the client device, a user of that device, or a combination of both of these entities.

A particular server 106 may be implemented as a computer or other stand-alone processing platform, or may be distributed over multiple processing platforms comprising multiple separate computers. The servers may be part of a single storage service or various subsets thereof may each be associated with independent storage services. Numerous other arrangements of multiple servers are possible in the storage system 100. The client device 102 and the servers 106 are examples of what are more generally referred to herein as "processing devices."

The client device 102 will generally include a user interface through which an associated user can interact with the system. This interaction allows the user to store files using one or more of the servers 106, to verify that any such stored files are actually stored in an encrypted format or with other appropriate file protections provided by the cloud storage provider 110, and to retrieve any such stored files.

As indicated above, the client device 102 may interact directly with one or more of the servers 106. Alternatively, at least a portion of the interaction between the client device and the servers may be carried out via an associated intermediary, illustratively shown in this embodiment as controller 108. Other types of intermediary processing devices may be arranged between the client device and the servers in other embodiments, such as switches, routers or other network equipment.

The network 104 may comprise, for example, a wide area network (WAN) such as the Internet, a local area network (LAN), a satellite network, a telephone or cable network, or various portions or combinations of these and other types of networks.

The network 104 over which servers 106 and controller 108 communicate with one another and with client device 102 is an example of a type of arrangement commonly referred to as a "cloud." File storage involving one or more of the N servers is representative of a cloud storage environment, and such an environment may also comprise other associated devices such as switches, routers and other network equipment. The servers 106 and controller 108 may be viewed as one example of what is more generally referred to herein as a "file system." That term is intended to be broadly construed so as to encompass a wide range of cloud storage environments including distributed storage environments based on virtual machines or other types of virtual infrastructure. Thus, a file system may comprise a single server or other processing device, or various combinations of such devices.

In an exemplary set of processing operations of the system 100, the client device 102 directs that a file in a first format be stored in the file system in a second format different than the first format. As mentioned previously, the first format may be an unencrypted format and the second format may be an encrypted format. The client device subsequently requests proof from the file system that the file is stored by the file system in the second format. The client device receives the proof from the file system responsive to the request, and verifies that the file is stored in the second format based on that proof. For example, the client device may determine if the proof was generated by the file system within a designated amount of time from the corresponding request. If it was so generated, the proof will be accepted, and if it was not, the proof will be rejected. The designated amount of time may be an amount of time less than that which would be required to convert the file from the unencrypted format to the encrypted format responsive to the request.

It is to be appreciated that a given embodiment of the system 100 may include multiple instances of client device 102, network 104, server set 106, and controller 108, although only single instances of such components are shown in the simplified system diagram for clarity of illustration. For example, a given user may have multiple personal computing devices that access different sets of servers over different networks. The particular number of servers in a given such set of servers is arbitrary and may vary depending upon the application, and thus the server sets may all have different numbers of servers.

Figure 2:
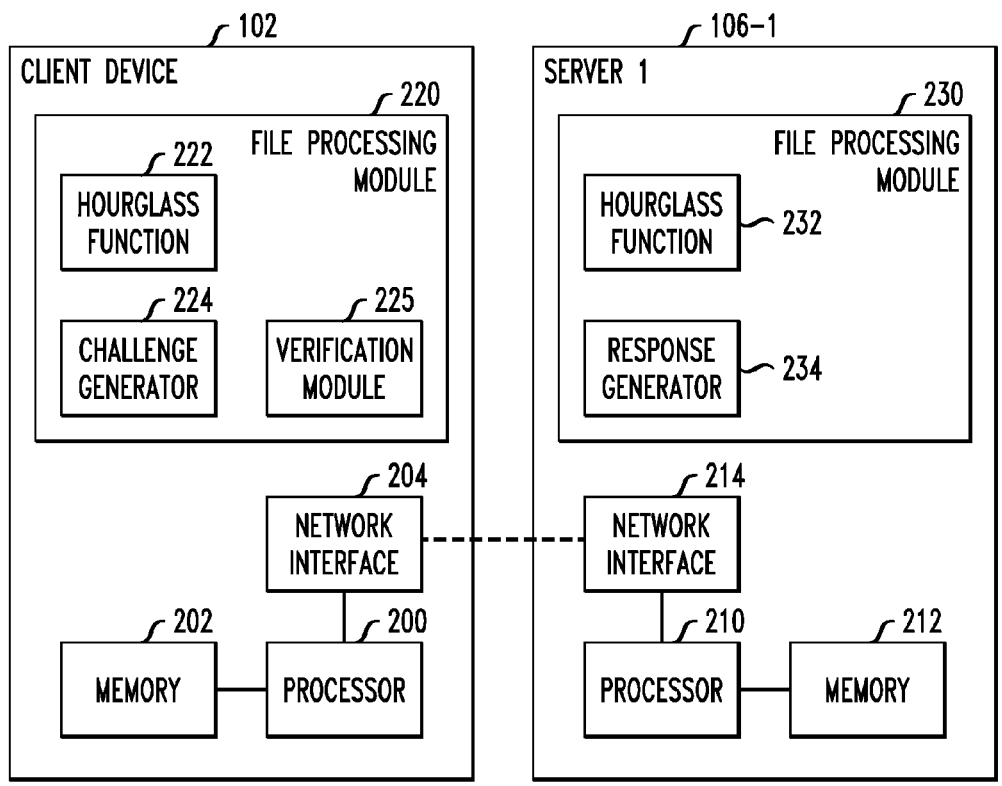
FIG. 2 is a more detailed view of a client device and a server of the FIG. 1 system.

Referring now to FIG. 2, a more detailed illustrative implementation of client device 102 and a given server 106-1 is shown. The other servers 106-2 through 106-N are each assumed to be configured in substantially the same manner as server 106-1.

The client device 102 in this embodiment comprises a processor 200 coupled to a memory 202 and a network interface 204. Similarly, the server 106-1 comprises a processor 210 coupled to a memory 212 and a network interface 214. The client device and server communicate with one another using their respective network interfaces. This communication in the FIG. 1 embodiment may be via controller 108, and additionally or alternatively may be direct communication or via one or more other intermediary devices. The network interfaces 204 and 214 may comprise conventional transceiver circuitry of a type well known to those skilled in the art. The processors 200 and 210 may comprise microprocessors, microcontrollers, application-specific integrated circuits (ASICs), field programmable gate arrays (FPGAs) or other types of processing circuitry, as well as portions or combinations of such circuitry elements.

The client device 102 and server 106-1 further comprise respective file processing modules 220 and 230. These modules collectively implement the file protection verification protocol shown in FIG. 3, and can also or alternatively implement other types of file protection verification protocols described herein. The module 220 of client device 102 is illustratively shown as comprising an hourglass function 222, a challenge generator 224, and a verification module 225. The module 230 of the server 106-1 is illustratively shown as comprising an hourglass function 232 and a response generator 234. Of course, these particular arrangements of modules are exemplary only, and other embodiments may use different arrangements of modules to provide the described functionality.

The file processing module 220 of the client device 102 may be implemented in whole or in part in the form of one or more software programs stored in memory 202 and executed by processor 200. Similarly, the file processing module 230 of the server 106-1 may be implemented at least in part in the form of one or more software programs stored in memory 212 and executed by processor 210. The memories 202 and 212 may each be viewed as an example of what is more generally referred to herein as a "computer program product" having executable computer program code embodied therein. Such memories may comprise electronic memories such as random access memory (RAM), read-only memory (ROM) or other types of memory, in any combination. The computer program code when executed in a processing device such as client device 102 or server 106 causes the device to perform corresponding operations associated with file storage, file retrieval and file protection verification. One skilled in the art would be readily able to implement such software given the teachings provided herein. Other examples of computer program products embodying aspects of the invention may include, for example, optical or magnetic disks.

In alternative embodiments, one or more of the modules associated with the client device 102 or the server 106 may be implemented at least in part within a separate entity such as the controller 108.

Figure 3:
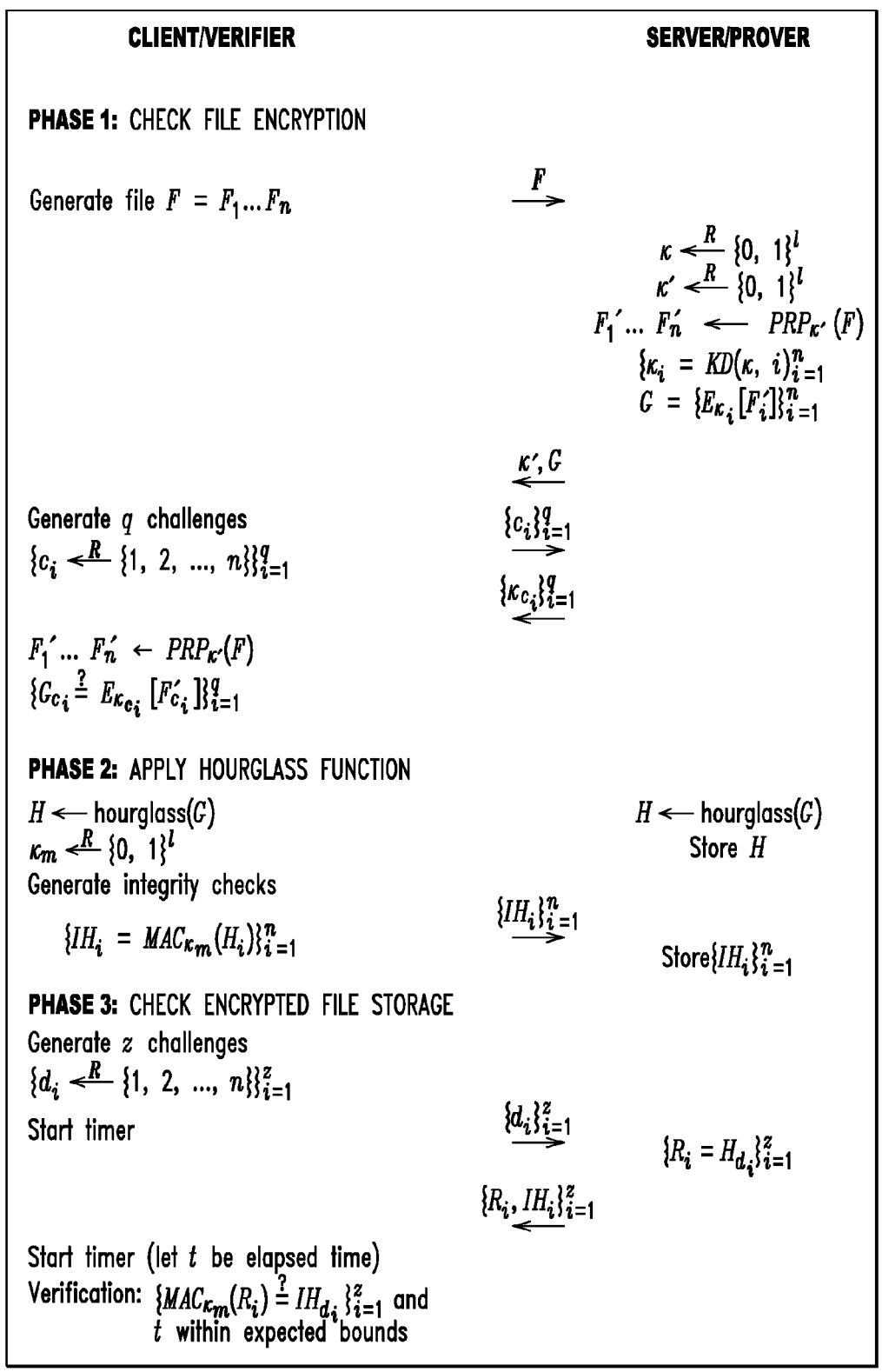
FIG. 3 shows an exemplary file protection verification protocol implemented in the system of FIG. 1.

The storage system 100 in an illustrative embodiment implements a cryptographic protocol for file protection verification, an example of which is shown in FIG. 3. The protocol is also referred to herein as an "hourglass" protocol, in that it imposes a resource bound (e.g., time) on the process of translating a file from one encoding domain (e.g., plaintext) to a different one (e.g., ciphertext). The hourglass protocol is analogous in this respect to the operation of a conventional hourglass, in which movement of accumulated sand from an upper chamber of the hourglass to its lower chamber is constrained by the time required to pass through the narrow neck between the two chambers.

Advantageously, the hourglass protocol can be used by a cloud storage provider to demonstrate to a client that a given cloud-based file is stored in encrypted form under a cloud-managed key. It can also be used for verification of other file protections, such as storage of the file with an embedded "provenance tag" that pinpoints the origin of a file leak, or storage of a file inextricably with another file.

As mentioned previously, it is very difficult in conventional practice for a client to verify that a cloud storage provider is actually storing a given file in encrypted format. Consider once again the example of client that entrusts cloud storage provider with file F, asking that the cloud storage provider store it encrypted under a secret key $\kappa$ as ciphertext G. It was noted above that the cloud storage provider can easily deceive the client by simply sending the client a random string R and claiming that R is the ciphertext G, or by storing F in unencrypted form and then computing G on the fly in response to a verification request from the client. The hourglass protocol of the present embodiment avoids this significant problem of the prior art by imposing a minimum time $\tau$ to translate a file from an unencrypted format to an encrypted format, based on a resource bound such as storage, computation or networking delays. The client can then challenge the cloud storage provider at a random time to produce G, and require that the provider do so in time less than $\tau$. By successfully complying, the cloud storage provider proves that it has actually stored G, and not F, because it would take too long to translate F into G in response to the challenge from the client. Therefore, by responding to the client in a sufficiently timely way, the cloud storage provider proves to the client that it has stored the ciphertext G.

Figures 4A, 4B:
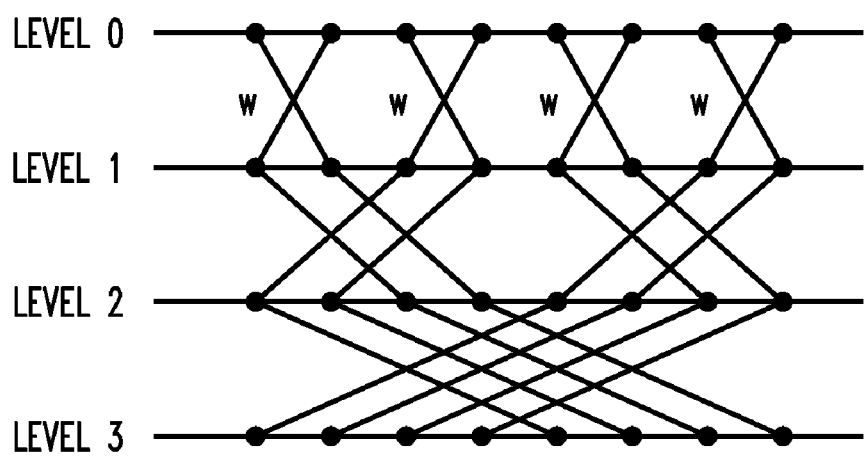
FIGS. 4A and 4B illustrate one example of an hourglass function that may be utilized in the file protection verification protocol of FIG. 3.

The hourglass protocol in the illustrative embodiment combines a properly parameterized resource bound with what is referred to herein as an hourglass function. As noted above, the resource bound is a time limitation imposed by one or more physical resources of the file system, such as storage, computation or networking delays. For example, hard drives experience delays due to seek time and bandwidth, and thus can serve as a resource bound. The hourglass function, implemented by modules 222 and 232 in the respective client device 102 and server 106-1 as shown in FIG. 2, is a cryptographically or coding-theoretically invertible function that imposes a lower bound on the number of resources required to translate between coding domains, so as to ensure a certain level of difficulty in the translation. A more detailed example of an hourglass function that may be utilized in modules 222 and 232 is a butterfly hourglass function, one possible implementation of which is shown in FIGS. 4A and 4B.

In describing the exemplary FIG. 3 protocol, it will be assumed without limitation that a given file F is to be stored in encrypted form on one of the servers 106-1 of the cloud storage provider 110 at the request of the client device 102. In this scenario, the client is the verifier and the server is the prover, as indicated at the top of FIG. 3. The FIG. 3 protocol also assumes a model in which the cloud storage provider manages the encryption key, and never divulges it to the verifier. The diagram shows the operations performed by the client and server and the flow of information between these elements in carrying out the protocol. The prover in other embodiments may additionally or alternatively comprise another of the servers 106, the controller 108, or cloud storage provider 110.

It should be noted that the FIG. 3 protocol provides a number of additional refinements relative to the general description above. For example, in this particular protocol, the client 102 does not challenge the server 106-1 on G directly. Instead, the hourglass function is applied to G, yielding an encapsulated file H, before the server stores it. The client then challenges the server on a randomly-selected file block, rather than a full file. More particularly, the client challenges the server at to produce a randomly-selected block $H_i$, as a proof that the server stored F in encrypted form. The hourglass function enforces a resource requirement, e.g., a time delay, on the translation from G to $H_i$. For example, every block $H_i$ may depend on many spread-out blocks of G. Therefore, if the server wishes to cheat, it must first encrypt many blocks of F to get G, and then use the resulting blocks of G to compute $H_i$. If each block retrieval carries a small time delay due, for example, to hard drive seek times, the hourglass function has the effect of amplifying this delay into a larger one. If the server stores H, the encapsulation of the ciphertext G, it can furnish $H_i$ with a single block fetch. Otherwise, it incurs the delay of many block fetches. A sufficiently quick response by the server thus proves storage of a ciphertext on F.

The protocol of FIG. 3 includes three phases, denoted Phase 1, Phase 2 and Phase 3. Phase 1 involves checking correct file encryption, Phase 2 involves applying the hourglass function, and Phase 3 involves checking encrypted file storage. Let n denote the number of file blocks in a given file F, and $F_i$ denote block i of F. The length in bits of a file block is given by l, such that $F_i \in B=GF[2^l]$. Suitable values of l are 128 or 256, although other values can be used.

In Phase 1 of the protocol, the client 102 sends the file F to the server 106-1. As noted above, these entities are also referred to as verifier and prover, respectively, in the context of the protocol. The server encodes F into ciphertext G using an encryption under a secret key unknown to the client. More specifically, the server processes F under a pseudo-random permutation (PRP) to generate a permuted file F'. It randomly generates a master key κ of length l, uses κ as input to a key derivation function KD to derive a set of n keys $\{\kappa_i\}_{i=1}^n$, and encrypts the $i^{th}$ block of the permuted file under $\kappa_i$. This encryption function for a given block $F'_i$ of the permuted file F' is denoted $E_{\kappa_i}[F'_i]$, and may be implemented using AES or another known type of encryption. The server sends the ciphertext G and the additional key κ' to the client as indicated.

The key derivation function takes as input a master key κ of l bits and an index i and outputs a key $\kappa_i$ of l bits. The operation of the function may therefore be denoted as $\kappa_i \leftarrow KD(\kappa,i)$. The key derivation function may be, for example, the HKDF function described in IETF RFC 5869, "HMAC-based Extract-and-Expand Key Derivation Function (HKDF)," May 2010.

As indicated in the figure, the server randomly generates an additional key κ' for use with the PRP. The PRP takes as its input the additional key κ' and the n blocks of the file F and outputs the n blocks of the permuted file F'. The PRP may comprise, for example, a Halevi-Rogaway CMC tweakable enciphering mode denoted $CMC_{\kappa'}(F,T)$, with the tweak T being computed as $T \leftarrow h(id_F)$, where h(•) denotes a hash function and $id_F$ denotes a unique identifier of the file F. The unique identifier may comprise, for example, the full file name including the file system path.

To verify that the ciphertext G is correctly formatted, the client challenges the server to reveal q of the n keys selected at random, where q<n, and checks that the encryption is done correctly for these q randomly-selected keys. The PRP ensures that revealing a subset of the keys does not reveal the master key κ and therefore does not permit decryption of the file. Phase 1 of the protocol thus involves the server demonstrating to the client that G represents a correct encoding of file F.

In Phase 2 of the protocol, the encrypted file G is transformed by both the client 102 and the server 106-1 into an hourglass encapsulated file H, by application of an hourglass function hourglass(•) to G. This hourglass encapsulation transforms the encrypted file into a format suitable for provably-encoded storage. In particular, H has a format that lets the server prove that the file is stored in its encrypted form. The server stores the hourglass encapsulated file H. The client uses H to generate and store integrity checks in the form of message authentication codes (MACs) over the blocks of H. More specifically, the client randomly generates a key $\kappa_m$ and then generates an integrity check $IH_i=MAC_{\kappa_m}(H_i)$ for each of the i blocks of H. The integrity checks are sent by the client to the server and stored by the server, as indicated in the figure.

As mentioned above, one possible hourglass function that may be utilized in Phase 2 of the protocol is referred to herein as a butterfly hourglass function. This function will now be described in greater detail with reference to FIGS. 4A and 4B. Let w:B×B ↔ B×B denote a PRP over two file blocks, and thus an invertible operation. We model was an atomic operation and define our construction in terms of a sequence of applications of w to pairs of blocks. As we are interested here in constructing a function hourglass computable by both server and client, we assume that the key for w is published. We define hourglass: B" ↔ B" over encoded file G as follows. Define $G_0[i]=G[i]$ for all i For $1 \leq j \leq \log_2(n)$, we compute the output of level j as a function of level j−1, as shown by the algorithm in FIG. 4A. This construction may be represented as a network or graph. FIG. 4B shows an example butterfly network for n=8. In this representation, each set of values $G_j[1], \ldots, G_j[n]$ is a row of nodes. Two edges connect the input and output node pairs involved in each application of w. Globally, hourglass involves n $\log_2$ n invocations of w. By way of example, in an embodiment in which file blocks are of size l=128 bits, w can be implemented as an AES encryption over 2l=256 bits with a known key. The function reverse–hourglass=hourglass$^{-1}$ may be computed by exploiting the invertibility of w.

In Phase 3 of the protocol, the client 102 checks that the server 106-1 has stored the encrypted file. The client randomly generates z block indices $d_i$ and sends them as challenges to the server as indicated. The client also starts a timer when it sends the challenges. The server sends back the blocks $R_i$ of the hourglass encapsulated file H corresponding to the indices $d_i$. The client stops the timer when the blocks $R_i$ are received. The elapsed time t of the timer indicates the amount of time between transmission of the challenges and receipt of the response from the server. The server can aggregate its responses before sending them to the client, or can send them individually. The elapsed time may therefore be measured, for example, between sending of the last challenge and receipt of the corresponding response, or in a variety of other ways.

The client then performs two checks. First, it verifies that the blocks $R_i$ are correct by determining if $MAC_{\kappa_m}(R_i)$ is equal to $IH_d$ for each block. Second, the client verifies that the elapsed time t is within expected bounds. This phase therefore ensures that the server retrieves the blocks of H from storage, and does not compute them on the fly.

The time required by the server to reply to a given one of the challenges from the client in Phase 3 should be less than the time required to access a fraction of the plaintext file F and compute the hourglass transformation on the fly. For example, assume the server stores n file blocks, including a percentage p of plaintext blocks of F and the remainder a percentage 1−p of hourglass encapsulated blocks of H. For different values of p (e.g., 80% or 90%), one can determine experimentally how many blocks z the client needs to challenge so that with high probability (e.g., 99%) it can determine if the server is not storing the file in the correct format. The server can reply immediately to challenges for blocks of H that it stores. For the rest of the challenges, it has to compute the blocks $H_{d_i}$ on the fly and needs to access fraction p of the stored plaintext, which will result in a longer response time.

Although the above-described protocol allows the client to verify that the cloud storage provider has stored the file F in the appropriate encrypted format, it is also possible that the cloud storage provider might in addition store the file F in its unencrypted format, against the wishes of the client. However, there are operational and economic incentives for a provider only to meet its obligations to store encoded files. Among these is the simple desire to avoid unnecessary storage overhead.

It is to be appreciated that the particular operations of the FIG. 3 protocol are presented by way of illustrative example only, and other embodiments can use additional or alternative operations. For example, in both Phase 1 and Phase 3 of the FIG. 3 protocol, the client 102 can generate and send a single seed as a challenge to the server 106-1, instead of explicit block indices as previously described. The server can then derive the block indices $\{f_i \leftarrow KD(s_1,i)\}_{i=1}^{q}$ for Phase 1 and $\{d_i \leftarrow KD(s_3,i)\}_{i=1}^{z}$ for Phase 3, where $s_1$ and $s_3$ are the seeds for Phases 1 and 3, respectively, sent by the client to the server.

Also, different types of hourglass functions may be used. For example, one alternative hourglass function that may be used is based on a message-recoverable digital signature technique such as RSA PSS-R. In such an embodiment, the client generates a public/private signing key pair, uses the private key to sign encoded message blocks, and then discards the private key. The client then checks the correctness of the digital signature on a random block provided by the server in response to a challenge. Since the server cannot itself sign blocks, it can only pass verification by storing the original signatures, and thus the encoded file format G. It should be noted that this approach relies critically on the message-recoverability of the digital signature technique. With an ordinary signature technique in which messages are not inextricably bound to signatures, the server could cheat. It could retain the signatures on message blocks but throw away the encoded message blocks themselves. When challenged, it would simply rederive a required encoded message block on the fly and transmit it along with its signature.

As indicated above, other embodiments of the invention can utilize hourglass protocols to verify other types of file protections, such as storage of the file with an embedded provenance tag that pinpoints the origin of a file leak, or storage of a file inextricably with another file, both of which will now be described in greater detail.

Figure 5:
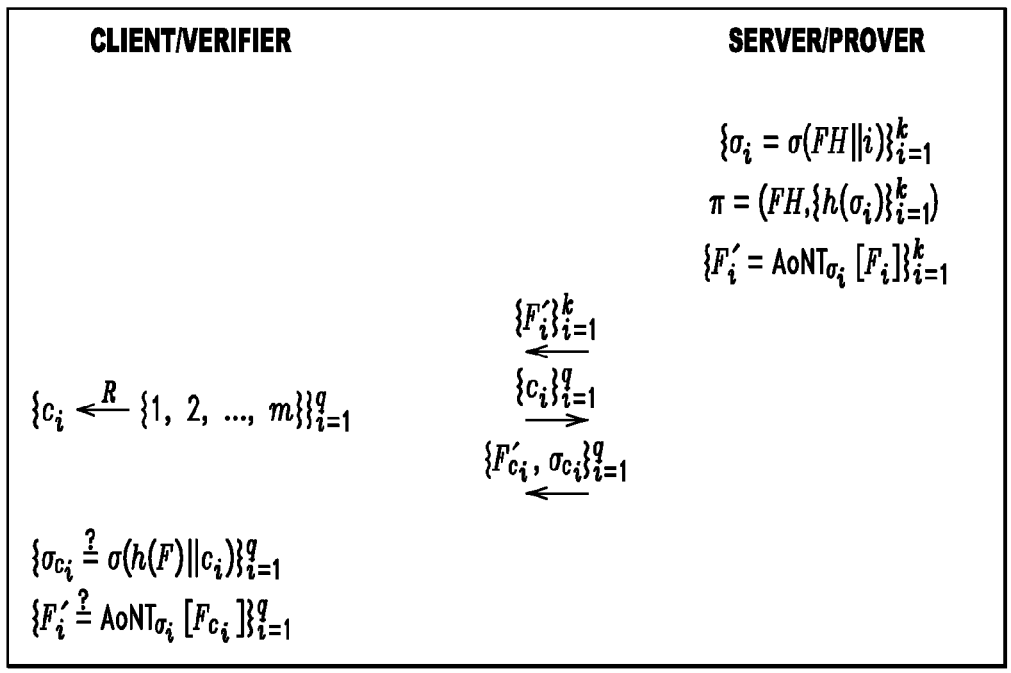
FIG. 5 shows an exemplary protocol for proving provenance tagging in the FIG. 1 system.

The storage of a file with an embedded provenance tag is an example of an encoding format more generally referred to herein as leak-incriminating encoding (LIE). An exemplary protocol for verification that a given file F is stored with an embedded provenance tag $\pi$ is shown in FIG. 5. If F is leaked, $\pi$ identifies the cloud storage provider as the source of the leak, and thus the responsible entity. In this protocol, it is infeasible to learn F without learning $\pi$, i.e., learning the file implies learning the provenance tag. The server is configured to prove to the client that $\pi$ is embedded in F without revealing $\pi$ itself. This is important, as a client or auditor that learns $\pi$ could frame the storage provider, falsely furnishing $\pi$ as evidence that F has leaked.

In the FIG. 5 protocol, $AoNT_\kappa$ denotes an all-or-nothing transform which requires a query on value $\kappa$ in order to extract the underlying plaintext, and $\sigma(M)$ denotes a digital signature by the server on message M. The provenance tag $\pi$ is published by the server or digitally signed. A proof of leakage by an external entity consists of z correct signatures, i.e., z signatures corresponding to hashed signatures in $\pi$. The value z is a security parameter such that $q<z\leq k$. The q challenges are generated by the client in the same manner as in Phase 1 of the FIG. 3 protocol. For additional details on an all-or-nothing transform suitable for use in this embodiment, see R. L. Rivest, "All-or-nothing encryption and the package transform," in FSE 1997, pages 210-218.

The storage of a file inextricably with another file is also referred to herein as file binding. In such an embodiment, two files F and G are stored in such a way that retrieval of one file implies retrieval of the other. For example, F might be a piece of software and G an accompanying license agreement. Binding the two together ensures that any entity retrieving F also gets G and therefore cannot claim failure to receive critical legal information governing the use of the software. In one possible implementation, a given set of files may be bound together via application of the all-or-nothing transform AoNT. Subsequent application of an hourglass function and challenge-response verification are then performed in a manner similar to that previously described.

As indicated previously, the file protection verification functionality disclosed herein can be implemented at least in part in the form of one or more software programs stored in memory and executed by a processor of a processing device such as client device 102, one or more of the servers 106, or controller 108. As indicated previously, a memory having such program code embodied therein is an example of what is more generally referred to herein as a "computer program product."

It should again be emphasized that the above-described embodiments of the invention are presented for purposes of illustration only. Many variations and other alternative embodiments may be used. For example, although described in the context of particular system and device configurations, the techniques are applicable to a wide variety of other types of storage systems and processing devices. The particular process steps used to verify protections for a given file may be varied in alternative embodiments. Also, the types of hourglass functions, challenges, responses and other protocol details used in a given alternative embodiment may be varied relative to the arrangements of the illustrative embodiments. In addition, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   requesting proof from a file system that a file having a first format is stored by the file system in a second format different than the first format, the second format providing a designated type of file protection in a file system;
   receiving the proof from the file system; and
   verifying that the file is stored in the second format using the proof provided by the file system responsive to the request;
   wherein the verification is based at least in part on a time-related minimum resource requirement, the minimum resource requirement being imposed by application of a function to the file in the second format to generate the proof; and
   wherein the requesting, receiving and verifying steps are performed by a processing device comprising a processor coupled to a memory.

2. The method of claim 1 wherein the verifying step comprises:
   determining if the proof was generated by the file system within a designated amount of time from the corresponding request;
   accepting the proof if it was so generated; and
   otherwise rejecting the proof.

3. The method of claim 2 wherein the first format is an unencrypted format and the second format is an encrypted format to which the function is applied.

4. The method of claim 3 wherein the designated amount of time is an amount of time less than that which would be required to convert the file from the unencrypted format to the encrypted format responsive to the request.

5. The method of claim 1 wherein the requesting step comprises requesting that the file system produce as the proof at least a portion of a result of applying the function to the file in the second format.

6. The method of claim 1 wherein the minimum resource requirement imposed on generation of the proof by the function comprises a minimum number of block retrievals.

7. The method of claim 1 wherein the minimum resource requirement imposed on generation of the proof by the function comprises a minimum number of computations of a particular type.

8. The method of claim 1 wherein the function comprises a butterfly function characterized by a butterfly network.

9. The method of claim 8 wherein the butterfly function comprises a sequence of applications of a permutation function to pairs of blocks of the file in the second format over multiple levels where outputs at level j are computed as a function of outputs at level j−1 for $1 \leq j \leq \log_2(n)$ and where n denotes a total number of blocks in the file.

10. The method of claim 1 wherein the function comprises a message-recoverable digital signature function.

11. The method of claim 1 wherein the second format comprises a leak-incriminating encoding format in which the file is stored with an embedded provenance tag.

12. The method of claim 1 wherein the second format comprises a file binding format in which the file is inextricably bound with at least one other file.

13. The method of claim 1 further comprising the step of checking that the file is correctly formatted by the file system into the second format by verifying transformation from the first format to the second format for randomly-selected portions of the file in the second format.

14. The method of claim 1 wherein the requesting, receiving and verifying steps further comprise:
   receiving the file in the second format from the file system;
   applying the function to the file in the second format;
   computing integrity checks for respective blocks of a result of applying the function to the file in the second format;
   sending the integrity checks for storage in the file system;
   randomly generating block indices and sending them as challenges to the file system;
   starting a timer when one or more of the challenges are sent;
   receiving blocks and associated integrity checks corresponding to the block indices from the file system;
   stopping the timer;
   determining an amount of time between the starting of the timer and the stopping of the timer;
   verifying that each of the received blocks is correct by recomputing the integrity check using the received block and comparing it to the previously-computed integrity check sent to the file system; and
   verifying that the determined amount of time is greater than a designated amount of time.

15. A computer program product comprising a non-transitory processor-readable storage medium having encoded therein executable code of one or more software programs, wherein the one or more software programs when executed cause a processing device to perform the following steps:
   requesting proof from a file system that a file having a first format is stored by the file system in a second format different than the first format, the second format providing a designated type of file protection;
   receiving the proof from the file system; and
   verifying that the file is stored in the second format using the proof provided by the file system responsive to the request;
   wherein the verification is based at least in part on a time-related minimum resource requirement, the minimum resource requirement being imposed by application of a function to the file in the second format to generate the proof.

16. An apparatus comprising:
   a processing device comprising a processor coupled to a memory;
   wherein the processing device further comprises a file processing module, the file processing module being operative to request proof from a file system that a file having a first format is stored by the file system in a second format different than the first format, the second format providing a designated type of file protection in a file system, to receive the proof from the file system, and to verify that the file is stored in the second format using the proof provided by the file system responsive to the request, the verification being based at least in part on a time-related minimum resource requirement, the minimum resource requirement being imposed by application of a function to the file in the second format to generate the proof.

17. A method comprising:
receiving a request for proof that a file having a first format is stored by a file system in a second format different than the first format, the second format providing a designated type of file protection in a file system;
generating the proof; and
sending the proof for verification;
wherein the verification is based at least in part on a time-related minimum resource requirement, the minimum resource requirement being imposed by application of a function to the file in the second format to generate the proof; and
wherein the receiving, generating and sending steps are performed by a processing device comprising a processor coupled to a memory.

18. The method of claim 17 wherein the receiving, generating and sending steps further comprise:
transforming the file from the first format to the second format;
applying the function to the file in the second format;
receiving and storing integrity checks for respective blocks of a result of applying the function to the file in the second format;
receiving block indices as challenges; and
responsive to the challenges sending blocks and associated integrity checks corresponding to the block indices as the proof.

19. A computer program product comprising a non-transitory processor-readable storage medium having encoded therein executable code of one or more software programs, wherein the one or more software programs when executed cause a processing device to perform the following steps:
receiving a request for proof that a file having a first format is stored by a file system in a second format different than the first format, the second format providing a designated type of file protection;
generating the proof; and
sending the proof for verification;
wherein the verification is based at least in part on a time-related minimum resource requirement, the minimum resource requirement being imposed by application of a function to the file in the second format to generate the proof.

20. An apparatus comprising:
a processing device comprising a processor coupled to a memory;
wherein the processing device further comprises a file processing module, the file processing module being operative to receive a request for proof that a file having a first format is stored by a file system in a second format different than the first format, the second format providing a designated type of file protection in a file system, to generate the proof, and to send the proof for verification, the verification being based at least in part on a time-related minimum resource requirement, the minimum resource requirement being imposed by application of a function to the file in the second format to generate the proof.

21. A method comprising:
requesting proof from a file system that a file having a first format is stored by the file system in a second format different than the first format, the second format providing a designated type of file protection in a file system;
receiving the proof from the file system; and
verifying that the file is stored in the second format using the proof provided by the file system responsive to the request;
wherein the proof is based at least in part on application of a function to the file in the second format, and the function imposes a minimum resource requirement on generation of the proof;
wherein the verifying step comprises: determining if the proof was generated by the file system within a designated amount of time from the corresponding request; accepting the proof if it was so generated; and otherwise rejecting the proof; and
wherein the requesting, receiving and verifying steps are performed by a processing device comprising a processor coupled to a memory.

22. A method comprising:
requesting proof from a file system that a file having a first format is stored by the file system in a second format different than the first format, the second format providing a designated type of file protection in a file system;
receiving the proof from the file system; and
verifying that the file is stored in the second format using the proof provided by the file system responsive to the request;
wherein the proof is based at least in part on application of a function to the file in the second format, and the function imposes a minimum resource requirement on generation of the proof;
wherein the function comprises a butterfly function characterized by a butterfly network;
wherein the butterfly function comprises a sequence of applications of a permutation function to pairs of blocks of the file in the second format over multiple levels where outputs at level are computed as a function of outputs at level for and where n denotes a total number of blocks in the file; and
wherein the requesting, receiving and verifying steps are performed by a processing device comprising a processor coupled to a memory.

23. A method comprising:
requesting proof from a file system that a file having a first format is stored by the file system in a second format different than the first format, the second format providing a designated type of file protection in a file system;
receiving the proof from the file system; and
verifying that the file is stored in the second format using the proof provided by the file system responsive to the request;
wherein the proof is based at least in part on application of a function to the file in the second format, and the function imposes a minimum resource requirement on generation of the proof;
wherein the requesting, receiving and verifying steps further comprise: receiving the file in the second format from the file system; applying the function to the file in the second format; computing integrity checks for respective blocks of a result of applying the function to the file in the second format; sending the integrity checks for storage in the file system; randomly generating block indices and sending them as challenges to the file system; starting a timer when one or more of the challenges are sent; receiving blocks and associated integrity checks corresponding to the block indices from the file system; stopping the timer;
determining an amount of time between the starting of the timer and the stopping of the timer; verifying that each of the received blocks is correct by recomputing the integrity check using the received block and comparing it to the previously-computed integrity check sent to the file system; and verifying that the determined amount of time is greater than a designated amount of time; and wherein the requesting, receiving and verifying steps are performed by a processing device comprising a processor coupled to a memory.

* * * * *

UNITED STATES PATENT AND TRADEMARK OFFICE
CERTIFICATE OF CORRECTION

PATENT NO. : 8,346,742 B1  
APPLICATION NO. : 13/075848  
DATED : January 1, 2013  
INVENTOR(S) : Ari Juels et al.

Page 1 of 1

It is certified that error appears in the above-identified patent and that said Letters Patent is hereby corrected as shown below:

On the Title Page Item (73), please add assignee information as follows:

EMC Corporation, Hopkinton, Massachusetts

Signed and Sealed this  
Seventh Day of May, 2013

Teresa Stanek Rea  
*Acting Director of the United States Patent and Trademark Office*